United States Patent Office 3,421,942
Patented Jan. 14, 1969

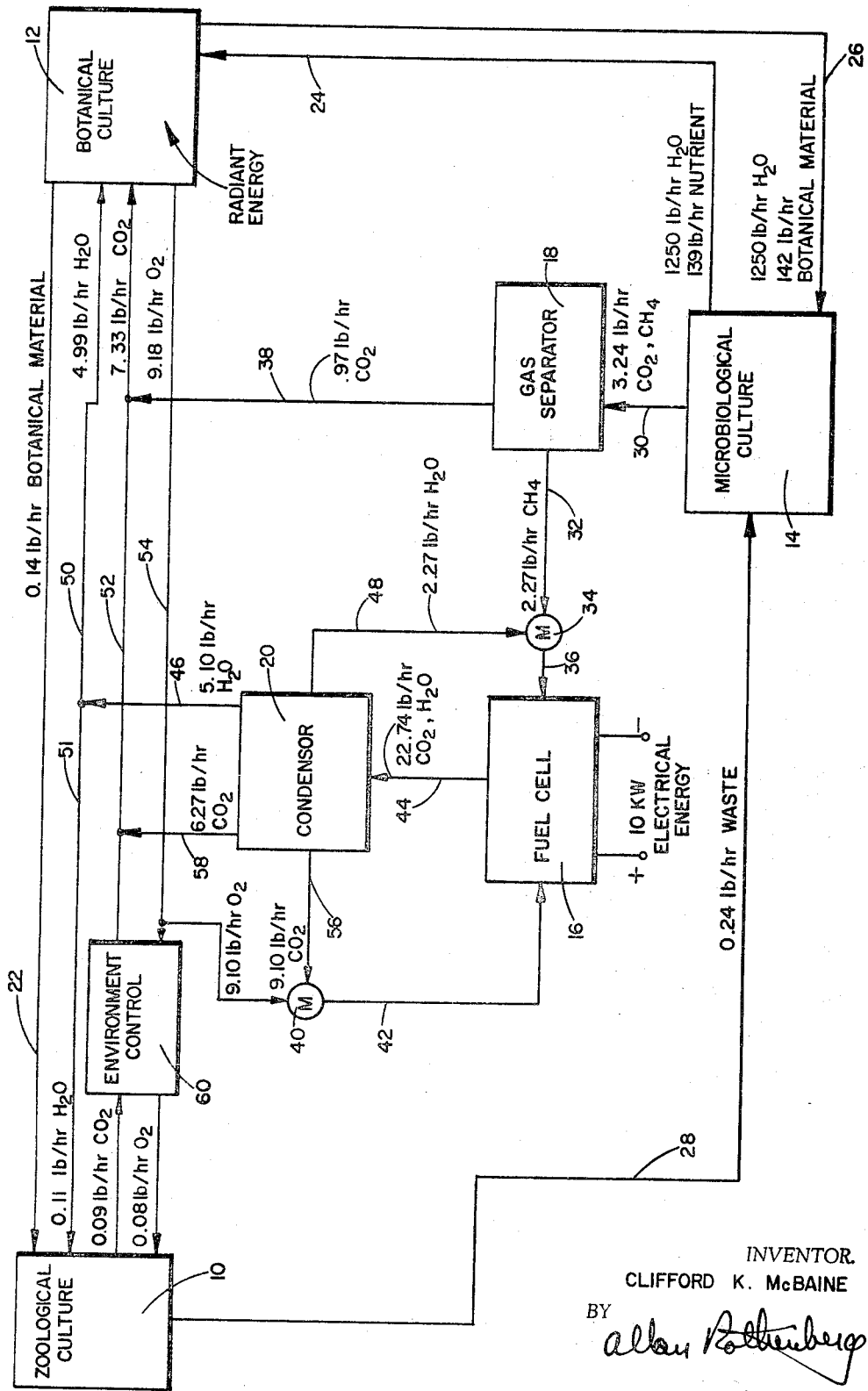

3,421,942
METHOD AND APPARATUS FOR PRODUCING
ELECTRICITY COMPRISING A FUEL CELL
IN COMBINATION WITH AN ECOLOGICAL
SYSTEM
Clifford K. McBaine, La Habra, Calif., assignor to North
American Rockwell Corporation, a corporation of
Delaware
Filed Oct. 5, 1962, Ser. No. 228,573
U.S. Cl. 136—86     2 Claims
Int. Cl. H01m 27/24

This invention relates to a method for sustaining an ecological system and producing electrical energy.

The modern trend of space exploration is toward the establishment of bases for long term use in remote locations. The establishment of any base requires not only the life support necessary for man but also the availability of energy in useful form to conduct scientific programs. Because of the harsh environment of space, other planets or satellites, it is necessary that a habitable environment be provided. This environment desirably is self sustaining with a minimum of communication from the earth. Food, water, and oxygen must be supplied to the inhabitants of the space station. Disposal must be made of carbon dioxide and liquid and solid wastes. Large quantities of energy are also necessary for operation of the integrated system, for the conduct of scientific programs and for communications.

Simulation of an integrated system for life support, and conversion of energy is a necessary prologue to the establishment of a station outside of the earth's atmosphere. By isolating a zoological culture, including man and possibly other animals, in a space simulator where substantially all communication of matter with the outside environment is eliminated, the condition of self reliance necessary in remote space stations can be reasonably and adequately simulated. The physiological and psychological reactions of the zoological culture in a substantially closed system are studied in such a simulator. Training of personnel for prolonged inhabiting of similar spaced stations can be accomplished in an integrated simulator. Information relating to many different aspects of ecological systems and methods becomes available from such simulation.

Previous methods for sustaining a zoological culture have involved the addition of organic material to the system in the form of food and the methods have involved the removal or storage of waste materials. At best, previous methods have been concerned with the recovery of potable water from body wastes or regeneration of atmospheric oxygen from expired carbon dioxide. Methods of life support have involved disposed of substantial quantities of the matter used in the method. Generation of electrical energy to perform useful work is external to the environment and makes no contribution to the matter in the integrated life support system.

It is therefore an object of this invention to provide a method of integrated life support and electrical generation.

Practice of the principles of this invention according to a preferred embodiment involves a number of steps each of which is a known process or operation. The principles of this invention involve a method for the integration and intercooperation of previously known conventional processes to give a new and heretofore unobtainable performance. By specified performance of operations of these processes upon materials derived from other steps in the method and reapplying products of the processes to the several other steps in accordance with the concepts of this invention, the matter employed in the practice of the method is continually recycled and reutilized to maintain the mass of matter involved substantially constant, and electrical energy becomes available.

Implementation of the principles of this invention is achieved in an exemplary embodiment by the processes of catabolism by a zoological culture, photosynthesis or anabolism by a botanical culture, fermentation by a microbiological digester, electrochemical reaction by a fuel cell and a specified interrelation of these processes. The described embodiment provides a method for the generation of substantial quantities of electrical energy indirectly from radiant energy from an external source and also permits the sustenance of a zoological culture in a closed environment with a balanced ecology.

In the practice of this invention and for the integration of the above processes an important step is the photosynthesis by botanical material of water, carbon dioxide, and nutrients to produce additional botanical material and oxygen when the botanical material is exposed to radiant energy. A portion of the botanical material and the oxygen are ingested for sustaining catabolism in zoological material, enabling the zoological material to perform useful work and yielding carbon dioxide and other waste materials. There is the further step of fermenting the wastes from the zoological material and a portion of the botanical material by microbiological activity to produce nutrient and carbon dioxide for the photosynthesis step and combustible fluids. These combustible fluids are reacted electrochemically by a fuel cell with oxygen derived from the botanical material to produce electrical energy and carbon dioxide and water. The water is further made available to the zoological material for the catabolism step and to the botanical material for the photosynthesis step. Carbon dioxide from the various steps is circulated to the botanical material and is assimilated in the photosynthesis process. Integration of these steps according to the principles of this invention results in the sustenance of a zoological culture and the production of electrical energy in a sufficient quantity to perform useful work. Production of material in predetermined quantities and recycling and reutilization of the material in the several steps of the method substantially conserves the quantity of matter employed in the practice of the method.

Accordingly, it is a broad object of this invention to provide a method for sustaining life and also producing substantial quantities of electrical energy.

Another object of this invention is to provide a method for producing electrical energy from solar energy by an indirect process and also producing food and oxygen for life support.

A further object of this invention is to provide a method for producing electrical energy, food, oxygen and water and disposing of waste products with a minimum dissipation of matter.

A still further object of this invention is to provide a method eliminating the necessity of continuous communication of a life system with external sources of matter.

Another object of this invention is to provide a method of obtaining a habitable environment, electrical energy, and nutrients for life support.

Other objects and many of the attendant advantages of this invention will be readily appreciated as the same becomes better understood by reference to the following detailed description and considered in connection with the accompanying drawing wherein a preferred embodiment of a method of sustaining the ecological system and providing electrical energy is illustrated schematically.

In the illustrative embodiment a series of independent processes are carried out and a method is described for the integration and intercooperation of these processes and the self-regeneration of the system. A novel and useful method for the utilization of conventional operations is described wherein the system is self-regenerative and substantially mass balanced. In the specific embodiment of the ecological method illustrated in the schematic drawing there is included a zoological culture 10 wherein the process of catabolism of organic material is conducted; a botanical culture 12 which performs photosynthesis or anabolism and converts various nutrients to botanical material and oxygen; a microbiological culture 14 which performs the process of fermenting zoological wastes and botanical material; and a fuel cell 16 which conducts the electrochemical reaction process for the production of electrical energy. The processes are interconnected in a cooperative manner to recycle and reutilize the matter in the system, thereby achieving a balanced condition.

It will be readily appreciated that the practice of the novel method exemplifying the invention in the illustrated embodiment is merely by way of illustration and is equally applicable to a variety of purposes. The purpose contemplated herein is the operation of a space simulator for the study of a zoological culture. The method is equally applicable to the purpose of sustaining a zoological culture and providing electrical energy for extraterrestrial stations, natural and artificial satellites, and other planets.

To conduct the process of catabolism, zoological material is provided in the zoological culture 10. The requirements and products of the metabolic processes in all zoological material are substantially the same. Since the purpose of the illustrative embodiment of the method concerns the operation of a space simulator the catabolism process is best carried out in a human being. Training of personnel for space operations and the study of the physiological and psychological reactions of the human being can be conducted if this embodiment is chosen. Thus, the preferred zoological culture 10 in the schematic drawing is an "average" man with a known metabolic rate. With such a culture the requirements for food, water, oxygen, and the quantities of various waste products are prescribed. The nutrient intake of food, water, and oxygen of the zoological culture 10 is comprised substantially of materials which in some form are a permanent portion of the integrated system. The waste products of the zoological culture are also retained in the system to maintain a complete mass balance.

While a completely balanced system can be provided by the concepts of this invention, practical considerations suggest tolerance of some small degree of imbalance to an extent depending upon the specific application and expected duration of the system. Small quantities of matter can be added to the system in the form of dietary supplements of material such as minerals and vitamins and necessary medications without departing from the principles of this invention.

In the practice of the illustrated method it is contemplated that supplements of this type and small quantities of waste materials may be added to or subtracted from the system without affecting the method of operation. The method described is one for a substantially balanced system with little communication of matter with external sources. The method illustrated by the preferred embodiment requires a minimum of input and output of matter and can be considered as substantially closed or balanced. Any additions or dissipations of material in the circuit of the illustrated method are in minimized quantity and do not substantially affect the closed nature of the integrated ecological system.

As is well known, metabolism in any living system is comprised of two general processes involving complex organic molecules. Anabolism is the portion of the metabolic process concerned with the formation of complex molecules from other complex molecules and from simple inorganic materials. In order to form complex molecules it is necessary that energy be added in the process. This energy in living systems is usually in the form of chemical, electrochemical or radiant energy. The opposite portion in the metabolic process is one of catabolism wherein complex molecules are decomposed into less complex organic materials and simple inorganic molecules. Catabolism is normally associated with oxidation of some or all of the materials in the organic molecules. Energy is released in the catabolism process and is generally available in the form of chemical, electrochemical or thermal energy.

The two processes of catabolism and anabolism are concurrently present in living systems. As a general rule, the process of anabolism predominates in the botanical systems where the synthesis of complex organic molecules occurs at a much more rapid rate than the destruction of organic compounds by oxidation. Catabolism is occurring in botanical material in the decomposition of molecules in the nutrient, and also in some of the transfer processes occurring. Anabolism is the predominating reaction in the botanical material and is so considered herein. Photosynthesis is the process of anabolism wherein energy is supplied by exposure to radiant energy.

In zoological material the predominant reaction is one of catabolism wherein organic materials are decomposed to release thermal and electrochemical energy to sustain life and permit the doing of work. Anabolism is also occurring on a minor scale in the formation of new cellular material in the usual processes of growth and replacement of destroyed material. The effective reaction in zoological material can be considered to be one of catabolism since the products eliminated from the zoological material are less complex molecules than the input to the zoological material. Thus, the effective process in botanic material is hereinafter characterized as anabolism and the process in zoological material is characterized as catabolism.

Catabolism carried out by the zoological material requires the introduction of organic molecules, water, and oxygen. As a result of this process various waste products are produced which are delineated for the purpose of describing this method into carbon dioxide and other waste products. This latter category is comprised of urine, feces, perspiration and expired water vapor. As has been stated, a human being is preferred for the zoological culture for the purposes of the method as illustrated in the accompanying drawing. It should be readily apparent that the zoological culture 10 can comprise other mammals such as monkeys, mice, or rabbits, since the general metabolic processes of all the zoological materials is similar to that of a human being. The catabolism carried out by the zoological culture 10 is effective upon material supplied thereto as complex organic molecules. In the illustrated embodiment this organic material is produced as botanical material resulting from the process carried out by the botanical culture 12 and the botanical material is transferred to the zoological culture 10 as indicated by the flow line 22 in the drawing. This botanical material is ingested by the zoological culture 10 and catabolized to produce waste products and energy. Oxygen is also supplied to the zoological culture 10 from the botanical culture 12 as indicated by the flow line 54. As indicated by flow line 51, potable water is also provided to the zoological culture 10 by an electrochemical reaction process described below. Carbon dioxide from the zoological culture is circulated to the botanical culture 12 for assimilation and anabolism as indicated by the flow line 52.

The anabolic process carried out by the botanical culture 12 assimilates the carbon dioxide from the zoological culture 10 and from other portions of the system as described below. Water from the electrochemical reaction in the fuel cell and large quantities of nutrient from the fermenting process conducted by the microbiological culture are also assimilated and photosynthesized into botanical material and oxygen. In the preferred embodiment the botanical material in the botanical culture 12 is algae to provide rapid and efficient photosynthesis. A controllably variable large area of thin layers of algae suspended in the nutrient suspension are irradiated by solar energy. Control of concentrations, flow rates and degree of exposure of the algae in the nutrient suspension to solar radiation causes rapid and controlled photosynthesis or anabolism. After sufficient photosynthesis the algae is separated from the nutrient suspension by the naturally occurring flocculation of the micro-oganisms. The flocs settle to the bottom of the nutrient solution and the clear fluid is withdrawn to leave the substantially dried algae for further use. A small quantity of the algae is washed and transferred to the zoological culture for food as indicated by the flow line 22. The balance of the algae is transferred to the microbiological digester as indicated by flow line 26. Details of a preferred embodiment of botanical culture employed to conduct the anabolizing of botanical material in the illustrated method are described by Dewey in United States Patent No. 2,732,663 entitled System for Photosynthesis.

Harvesting of algae in the botanical culture is performed as described by W. J. Oswald and C. G. Golueke at pages 239 to 241 of Advances in Applied Microbiology, volume II (edited by W. W. Umbreit), 1960, Academic Press, Inc. (New York, N.Y.). Although a preferred embodiment for the botanical culture has been selected on the basis of economy and ease of installation and operation, it should be appreciated that a considerable range of equivalent botanical cultures having the predominant process of anabolism or photosynthesis can be employed in the practice of the illustrated method. Other arrangements capable of performing the anabolizing step in the described method are described in United States Patents: No. 2,854,792, to Walter Juda, for Method and Apparatus for Propagating Algae Cuture; No. 2,686,754, to Jacques Monod, for Apparatus for the Cultivation of Microorganisms; and No. 2,715,795, to Arthur J. Pallotta et al., for Microorganism Culture Method and Apparatus. Other types of higher plant life can be readily substituted for algae in the botanical culture.

Quantities of botanical material from the botanical culture 12 in excess of the requirements of the zoological culture 10 are transferred to the microbiological culture 14 as indicated by the flow line 26 in the drawing. Waste materials from the zoological culture 10 are also transferred to the microbiological culture 14 as indicated by the flow line 28. Fermenting of these waste materials and the botanical material is a further step in the embodiment of the method as illustrated in the drawing. The process of fermentation is one where complex organic molecules including carbohydrates, proteins, lipids, and cellulose are decomposed by micro-organisms. The various micro-organisms, which are principally bacteria, digest the complex organic molecules and convert them to simpler molecules. These in turn are the preferred nutrient for other strains of bacteria and further fermentation proceeds. The ultimate result of this stepwise fermentation is the production of methane, carbon dioxide, hydrogen, water, lower aliphatic acids, and alcohols and a variety of other organic and inorganic molecules many of which are not identifiable and need not be identified for the operation of the fermenting process nor the practice of the illustrated method.

The gaseous products of the fermenting process bubble out of the culture medium and are readily separated from the liquid and semisolid products. These latter products are in the form of a suspension of material in an aqueous solution, collectively identified as nutrient in the drawing and flowing to the botanical culture 12 as indicated by the flow line 24. In addition to the dry weight of nutritious materials flowing to the botanical culture 12 there is also a substantial amount of water accompanying the nutrient. This water returns to the microbiological culture 14 suspending a portion of the botanical material as indicated by the flow line 26. The material flowing between the botanical culture 12 and the microbiological culture 14 is preferably 80% to 95% water. The nutrient material transferred to the botanical culture 12 contains the mineral and organic compounds necessary to support the photosynthesis process of the botanical culture 12. The fermenting process is slow when compared with the other processes in the illustrative embodiment of this method. Optimum fermenting conditions are obtained by a total period of detention of material in the microbiological culture of six to ten days. The reactions occurring in the microbiological culture are substantially endothermic and are conducted in a temperature range of 120° to 132° F. Variation of the temperature of the fermentation regulates the reaction rate and permits balancing of the flow rates.

The fermentation of the organic material is principally due to the thermophilic anaerobic bacteria. These are the so-called heat loving bacteria that survive and multiply in the absence of air. Because of the complex nature of the organic materials present in the substrate the strains of bacteria that are involved in the fermentation process are of broad variety. Few of these strains have been identified but it is not necessary for the practice of this method that they be identified. Artificial inoculation of the microbiological culture by bacteria is not necessary in the practice of the illustrated embodiment of this method since naturally occurring inoculations are adequate. If, in the practice of this method natural inoculations need supplementing, additional strains of bacteria can be added to the microbiological digester to initiate the fermentation process. These strains are described by H. A. Barker, Bacterial Fermentations, 1956, John Wiley and Sons, Inc. (New York, N.Y.). Details of the preferred fermentation process in the exemplary embodiment are given by A. M. Buswell at pages 518 to 555 of Industrial Fermentations, (edited by L. A. Underkofler and R. J. Hickey), 1954, Chemical Publishing Co., Inc. (New York, N.Y.).

The gases produced in the fermenting process are principally methane and carbon dioxide. Some hydrogen is also present and also trace quantities of gases such as carbon monoxide, nitrogen and hydrogen sulphide. The carbon dioxide and the nitrogen are noncombustible gases and the methane, hydrogen, carbon monoxide, and hydrogen sulphide are combustible or oxidizable gases. The combustible fraction of the gases is substantially greater than the noncombustible carbon dioxide. In order to remove this carbon dioxide from the combustible gases, the gases from the microbiological digester are passed to a gas separator 18 as indicated by the flow line 30.

The separation process performed on the gases from the fermenting processes essentially separates the gases into the combustible and non-combustible fractions. This is true despite the fact that a small quantity of nitrogen is present in the combustible fraction since the principal non-combustible material is carbon dioxide. Thus, the gas separation process is in reality one of removing carbon dioxide from the remaining gases but is designated herein as separating combustible and non-combustible gases. This is a simple process of solution of the carbon dioxide in an aqueous solution of two molar potassium carbonate. The gases from the fermentation process are bubbled through the solution while cool and carbon dioxide is extracted by the formation of the bicarbonate in the solution. The other gases present pass freely through the solution and are withdrawn as indicated by the flow line 32. The bicarbonate solution is heated to decompose the bicarbonate to the carbonate and release carbon dioxide. Excess water vapor is removed from the carbon dioxide. The carbon dioxide then passes to the botanical culture as indicated by the flow line 38. In the illustrative embodiment of the drawing it is not necessary to remove water vapor from the combustible gases since steam is subsequently added to these gases.

Further details of this gas separation process are described by J. P. Hsu and A. B. Schwartz in Closed Circuit Respiratory Systems Symposium, WADD TR 60–574 published by the Office of Technical Services in August 1960, and R. C. Oliver and F. C. Risenfeld, in the same publication. A preferred embodiment of the gas separating step has been described. However, it should be appreciated that fully equivalent results for the purposes of the practice of the method are obtained by means of other well known techniques such as, for example, solution and regeneration of the carbon dioxide in water or amine solutions, absorption and regeneration in molecular sieves, freezing of the carbon dioxide or reversible reaction with metal oxides.

The combustible or oxidizable fraction of the gases from the gas separating step flow as indicated by the flow line 32 to a mixer 34. This combustible fraction is effectively entirely methane. The gas is over 97% by weight methane and less than 3% hydrogen, accompanied by traces of nitrogen, carbon monoxide, hydrogen sulphide and probably other gases. The methane is mixed with an equal weight of steam in a mixer 34 as indicated by the flow line 48. As indicated by flow line 36 the mixed gases then are passed for utilization in the electrochemical reacting step carried out by the fuel cell 16. The mixing of the steam with the methane aids the reacting step and promotes more complete oxidation of the methane.

The methane fuel is electrochemically reacted with oxygen to produce carbon dioxide, water and electrical energy. There is a direct conversion from chemical energy into electrical energy in an electrolytic cell. The chemical energy comes from the continuously replenished supplies of methane and oxygen. The electrochemical reaction is preferably carried out in what is commonly known as a fuel cell. Both the fuel and the oxygen react with an electrolyte at separate electrodes, and a low voltage, high current electron flow is available from these electrodes. The reaction is preferably carried out using a molten mixture of sodium, lithium, and potassium carbonates. A series of electrochemical reactions occur in this process and the summation of these reactions is the chemical combination of methane and oxygen to yield carbon dioxide and water plus a flow of electrons external to the location of the reaction. Water vapor is mixed with the methane in a mixer 34 and carbon dioxide is mixed with the oxygen in a mixer 40 before injecting them into the fuel cell 16 as indicated by the flow lines 36 and 42 respectively. As indicated above, the water promotes complete oxidation of the methane. The carbon dioxide is added to replenish the carbonate ion in the electrolyte during the reaction since electron transfer through the electrolyte is by means of the carbonate ion with consequent depletion at the oxygen electrode and carbon dioxide generation at the fuel electrode.

It should be recognized that the net reaction between the methane and the oxygen does not involve the recycled water and carbon dioxide. The process of this step can be conducted without this recycling. Thus, for example, one can substitute a process involving the intermediate steps of reforming the methane to carbon monoxide and hydrogen by reaction with water vapor and subsequent shifts of the carbon monoxide to carbon dioxide and hydrogen by further reaction with water vapor. The carbon dioxide is separated from the hydrogen and is followed by electrochemical reaction of the hydrogen with oxygen. The stepwise electrochemical reactions in the direct combination of methane with oxygen are not fully understood and it has been hypothesized that the stepwise process herein suggested as an equivalent of the direct process is the actual series of reactions appearing in the preferred process. Likewise the methane can be partially oxidized to methanol and this used as a fuel in the fuel cell. Details of a preferred embodiment of fuel cell for electrochemically reacting the methane and oxygen are described in U.S. Patent 2,980,749, to G. H. J. Broers, or Fuel Cell and Method of Producing Electrodes for Such a Cell. The theory of operation of fuel cells in general and equivalent fuel cells for carrying out the electrochemical reaction are described in Fuel Cells, Power for the Future, 1960, by George S. Lockwood, Jr. et al., and in U.S. Patent 2,830,109, to E. Justi et al., for Fuel Cell, U.S. Patent 2,913,511, to W. T. Grubb, Jr., for Fuel Cell, and U.S. Patent 2,925,454, E. Justi et al., for Direct Production of Electrical Energy from Liquid Fuels.

The carbon dioxide and gaseous water produced by the electrochemical reaction are transferred to a conventional condenser 20 as indicated by the flow line 44. This step in the practice of the method according to the illustrated embodiment separates liquid water from the gaseous carbon dioxide. A portion of the carbon doxide is diverted to the mixer 40 as indicated by the flow line 56. Some of the liquid water is vaporized to form steam to be mixed with the methane at the mixer 34 as indicated by flow line 48. The balance of the liquid water is distributed to the zoological culture 10 and the botanical culture 12 according to their respective needs as indicated by the flow lines 46 and 50. Carbon dioxide from the condensing step is circulated to the botanical culture for photosynthesis as indicated by the flow line 52.

It should be appreciated that storage capacity (not shown) is incorporated in various portions of the system to facilitate the pracice of the method of the illustrative embodiment. Thus, for example, temporary storage (not shown) for water, methane, carbon dioxide, and a portion of botanical material is provided in the flow lines 50, 32, 56 and 22 respectively. There is inherent storage capacity for the carbon dioxide and oxygen of the environment due to pressure changes that occur. These storage capacities are incidental to the practice of the method and provide temporary detention of material only because the requirements for food and water by the zoological culture are not completely uniform over a given time interval and the demand for electrical energy from the electrochemical reaction step also varies with time.

In the preferred embodiment of the method as illustrated the environment for the zoological culture is 68° to 70° F. with a relative humidity of 50±15%. The pressure is preferably a total of one atmosphere. The partial pressures of the principal gases in the environment are preferred as oxygen 147 to 157.3 mm. Hg, nitrogen 546 to 586 mm. Hg, carbon dioxide 3.6 to 7.6 mm. Hg, and water 7.7 to 10.5 mm. Hg. Substantial deviations from these partial pressures give fully equivalent results with the exception of the carbon dioxide partial pressure. When the carbon dioxide partial pressure exceeds approximately 7.6 mm. Hg detrimental physiological effects are noted in the zoological culture. The concentration of carbon dioxide is controllably limited by the assimilation of carbon dioxide by the botanical culture. Conventional processes are used for the control of temperature and relative humidity, and are indicated generally by the environment control 60 in the drawing. The temperatures of the fuel cell, microbiological culture and botanical culture are also controlled by conventional techniques so as to operate at their respective optimums or an approximation thereof.

An essential material in the environement is oxygen for respiration by the zoological culture and reaction in the fuel cell. All of the oxygen is derived from the botanical culture and its flow is indicated by the flow line 54 in the drawing. Besides botanical material the principal product of photosynthesis or anabolism is oxygen which passes into the environmental gases and is circulated to the zoological culture 10 and the mixer 40.

A necessary material for the photosynthesis is carbon dioxide which is also present in the gases of the environment. The flow of carbon dioxide is indicated by the flow lines 38, 58, and 52 in the drawing. The principal source of the carbon dioxide is the electrochemical reaction in the fuel cell and is indicated by the flow line 58. A substantial quantity of carbon dioxide is generated in the fermentation process in the microbiological culture and separated from the combustible portion of the gas in the gas separator 18, and flows as indicated by the flow line 38. Some carbon dioxide is also generated by the catabolism process and expired by the zoological culture 10, as indicated by the flow line 52.

Continuing the cycle described above reutilizes the matter in the system and makes the system self-regenerating. A minimum of matter is communicated external to the system. For a period determined by the amount, if any, of system imbalance and the tolerance of the system to build-up of unfavorable internal conditions, no matter need be added or withdrawn. There is a cyclic flow of matter in the system and a non-cyclic flow of energy through it producing electrical energy to perform useful work.

As an illustrative embodiment of the practice of the method there is included in the drawing the approximate rate of flow of the various materials in the integrated system. Substantial mass balance is obtained by these predetermined flows in the practice of the method. In a space simulator, for example, the zoological culture 10 is comprised of one human being and the fuel cell battery 16 produces electrical energy at an output rate of ten kilowatts. This quantity of energy is sufficient to provide a surplus of electrical energy for application externally of the system. The order of magnitude figures for the flow rates are all expressed in pounds of material per hour. It should be appreciated, however that these figures are averages of integrated values for a longer time period and that temporary detention or storage of material is incorporated in the individual processes occurring and in the flow lines therebetween.

Thus, for example, it will be readily appreciated that the consumption of botanical material as food by the zoological culture 10 will not be the indicated 0.14 pound per hour for every hour but that the average consumption per hour for a longer time period such as a day would be 0.14 pound per hour. In addition to these food requirements of the zoological culture, an average man requires an average of 0.11 pound per hour of water in addition to the contained water in the food. In this illustration the zoological culture also requires the relatively constant rate of 0.08 pound per hour of oxygen. The process of catabolism in the zoological culture requires as reactants the above mentioned botanical material, water, and oxygen. This catabolism yields 0.09 pound per hour of carbon dioxide and an average of 0.24 pound per hour of other body wastes, such as urine, feces, perspiration, and expired water vapor which are collected and transferred to the microbiological culture 14 for fermentation.

As described above the process of photosynthesis or anabolism is carried out in the botanical culture. The food for the zoological culture and the oxygen are products of this process. As indicated by the flow line 52, the expired carbon dioxide from the zoological culture passes to the botanical culture and is assimilated therein. Botanical material is produced in the botanical culture in quantities greater than the requirements of the zoological culture. Thus, about 142 pounds per hour of botanical material is transferred to the microbiological culture 14 as indicated by the flow line 26. In addition, about 1250 pounds per hour of water is circulated from the botanical culture to the microbiological culture as indicated by the flow line 26. The botanical material is in the form of a suspension in this water.

Fermentation of the botanical material and the wastes of the zoological culture is carried out in the microbiological culture 14. Approximately 139 pounds per hour of nutrient materials are returned to the botanical culture 12 from the microbiological culture 14 as indicated by the flow line 24. This nutrient material is in the form of a solution and suspension in the 1250 pounds of water per hour also flowing from the microbiological culture 14 to the botanical culture 12. These nutrient materials are necessary for the photosynthesis or anabolism process occurring in the botanical culture and promote the growth of further botanical material. The fermentation process further yields approximately 3.24 pounds per hour of gases, which are passed as indicated by the flow line 30 from the microbiological culture 14 to the gas separator 18.

Separating of the gases into carbon dioxide and other gases is carried out in the gas separator 18. Carbon dioxide is separated at the rate of about 0.97 pound per hour and circulates to the botanical culture 12 as indicated by the flow line 38. The other fraction of the gases from the microbiological culture 14 is comprised almost entirely of combustible gases and is substantially methane. About 2.27 pounds per hour of methane is separated in this process.

Mixing of the 2.27 pounds per hour of methane with 2.27 pounds per hour of water is carried out in the mixer 34. The water comes from the condenser 20 in the form of steam as indicated by the flow line 48. These mixed gases are injected into the fuel cell 16 as indicated by the flow line 36.

Approximately 9.10 pounds per hour of oxygen is utilized in the fuel cell 16 and is derived from the photosynthesis process in the botanical culture. This oxygen is extracted from the internal environment of the system and mixed with 9.10 pounds of carbon dioxide in the mixer 40. The carbon dioxide comes from the condenser 20 as indicated by the flow line 56.

Electrochemical reaction of the methane and the oxygen is carried out in the fuel cell to produce about ten kilowatts of electrical energy. The water vapor and carbon dioxide injected into the fuel cell with the fuel and oxygen respectively facilitate the operation of the fuel cell but remain unchanged in the net reaction of the fuel cell. The electrochemical reaction in the fuel cell also yields about 22.74 pounds per hour of mixed carbon dioxide and water vapor. As mentioned above, 9.10 pounds per hour of the carbon dioxide and 2.27 pounds per hour of the water vapor are recycled from the condenser 20 to the fuel cell 16 as indicated by the flow lines 56 and 48 respectively. In addition 5.10 pounds per hour of liquid water is extracted from the gases entering the condenser. This water is available to the zoological culture 10 at the average rate of 0.11 pound per hour and is used for irrigation of the botanical culture 12 at the rate of approximately 4.99 pounds per hour as indicated by the flow line 50. In the aggregate the botanical material in the botanical culture 12 assimilates about 7.33 pounds per hour of carbon dioxide from the above mentioned sources producing the botanical material and 9.18 pounds per hour of oxygen which is circulated to the zoological culture 10 and the fuel cell 16 as indicated by the flow line 54.

The various individual processes in the practice of this method in the illustrated embodiment proceed at various rates. Because of the times involved there is a detention of substantial quantities of material in the individual processing steps in addition to the flow rates between the individual processes occurring. The anabolizing or photosynthesis process in the botanical culture incorporates approximately 2500 pounds of algae at all times. This provides sufficient quatities of oxygen for the zoological culture and the fuel cell and provides a balance between the constructive process of anabolism and the destructive processes of fermentation and catabolism. A maximum of over 30,000 square feet of botanical culture can be exposed to irradiation by solar energy to absorb sufficient energy for the practice of the method in this specific embodiment. The flow rate of 139 pounds per hour of nutrient to the botanical culture requires about 27,000 pounds of botanical material in various stages of decomposition and fermentation in the microbiological culture. Approximately 125,000 pounds of water is incorporated in the illustrated embodiment in temporary storage and in the botanical and microbiological cultures. Considerable quantities of matter are also involved in the gaseous environment of the illustrated embodiment including the nitrogen which is virtually inert so far as the practice of this method is involved. There is a total quantity in excess of 1500 pounds of gas.

The specific embodiment of the invention as described above is a practical mechanization involving a number of individual processes as presently practiced, but is intended to be an exemplary embodiment of but one of several forms which may be utilized by those skilled in the art to practice the principles of this invention.

It will be readily appreciated that the disclosed invention provides a method for mass-balancing a self-regenerative ecological and electrical generation system. Additionally it provides a method for producing electrical energy, food and oxygen for life support.

Obviously many modifications and variations of the present invention are possible in the light of the above teachings. It is therefore to be understood that within the scope of the appended claims the invention may be practiced otherwise than as specifically described.

What is claimed is:

1. A method for integrating the operation of a life system having a plurality of animals, photosynthetic plants, a microbiological digester containing anaerobic bacteria and an electrochemical fuel cell comprising the cyclically repetitive steps of:
   - injecting a minor proportion of body wastes from the animals and a major proportion of said plants into the microbiological digester;
   - fermenting said body wastes and said plants by the anaerobic bacteria to produce carbon dioxide, methane, and decomposed carbohydrates, proteins, lipids and cellulose;
   - separating said carbon dioxide and said methane from said decomposed carbohydrates, proteins, lipids, and cellulose;
   - separating said carbon dioxide from said methane;
   - supplying said decomposed carbohydrates, proteins, lipids and cellulose to the plants;
   - exposing the plants to radiant energy;
   - anabolizing carbon dioxide, water, and decomposed carbohydrates, proteins, lipids and cellulose to produce oxygen and grow photosynthetic plants;
   - injecting methane from the separating steps and oxygen from the anabolizing step of the plants into the fuel cell;
   - electrochemically reacting said methane and said oxygen in the fuel cell to produce electrical energy, water and carbon dioxide;
   - condensing said water from said carbon dioxide;
   - mixing a portion of the carbon dioxide from the condensing step with oxygen from the plants before injecting the oxygen in the fuel cell;
   - mixing a portion of the water from the condensing step in the form of steam with the methane before injecting the methane into the fuel cell;
   - transferring major and minor portions of said water from the condensing step to the plants and animals respectively;
   - transferring oxygen and plants to the animals;
   - catabolizing the water and plants by the animals to produce carbon dioxide and body wastes;
   - transferring carbon dioxide from the second mentioned separating step, from the condensing step, and from the catabolizing step to the plants for use in the anabolizing step.

2. In a life support and energy generating system the combination comprising:
   - a body of growing algae adapted to be exposed to light and evolving oxygen in the growth thereof;
   - a microbiological digester including anaerobic bacteria evolving methane and carbon dioxide;
   - separating means for separating the methane and the carbon dioxide;
   - means for transferring liquid and solid material from the digester to the algae;
   - means for transferring a portion of said algae to the digester;
   - an electrochemical fuel cell for providing electrical energy, carbon dioxide and water;
   - condenser means for separating carbon dioxide and water from the fuel cell;
   - means for transferring carbon dioxide and water from the fuel cell to the condenser;
   - means for mixing a portion of carbon dioxide from said condenser with oxygen from the algae;
   - means for transferring oxygen from the algae to the mixing means;
   - means for transferring carbon dioxide from the condenser to the mixing means;
   - means for transferring to the fuel cell methane from the separating means, and oxygen and carbon dioxide from said mixing means;
   - means for transferring to the algae a portion of carbon dioxide from at least one of said condenser and separating means;
   - means for transferring water from the condenser means to the algae;
   - a zoological culture;
   - means for transferring algae from said body of algae and water from said condenser means to said zoological culture;
   - means for transferring waste from said zoological culture to said digester; and
   - means for transferring carbon dioxide from said zoological culture to said algae.

References Cited

UNITED STATES PATENTS 3,228,799   1/1966   Rohaback _____ 136—86

OTHER REFERENCES

Business Week, p. 68, May 6, 1961.
Science and Mechanics, pp. 116–117, August 1961.
Industrial Microbiology, Prescott and Dunn 2nd ed., pp. 539 and 826, 1949.

WISTON A. DOUGLAS, *Primary Examiner.*

H. FEELEY, *Assistant Examiner.*

U.S. Cl. X.R.

195—1